3,540,934
MULTIPLE CELL REDOX BATTERY
Jan Boeke, 70 Monument St.,
Concord, Mass. 01742
Filed July 11, 1967, Ser. No. 652,489
Int. Cl. H01m 27/26
U.S. Cl. 136—86     2 Claims

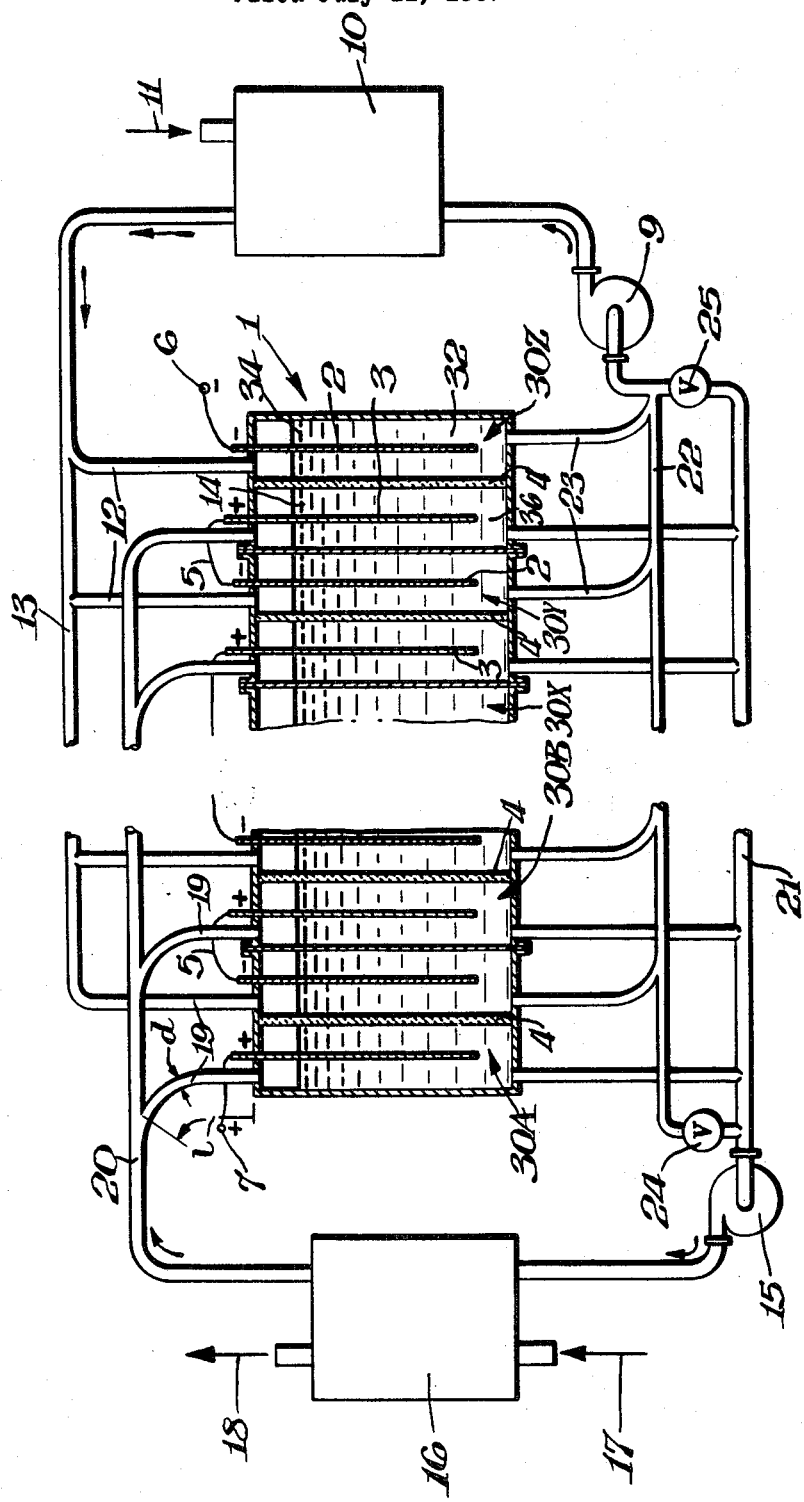

ABSTRACT OF THE DISCLOSURE

Series-connected multiple redox cell battery with anolyte and catholyte sections of each cell being connected by non-conductive tubing to separate regenerators. The connecting tubing having a ratio of length to inside diameter of at least ten to one. If the overall anolyte and catholyte compositions are similar, portions of each may be mixed to balance the amounts circulating in the anolyte and catholyte sections and to provide heat for eliminating waste fuel products.

CROSS-REFERENCE TO RELATED APPLICATIONS

This present application advantageously utilizes the system described and claimed in copending application for U.S. patent Ser. No. 652,417, filed July 11, 1967.

BACKGROUND OF THE INVENTION

Copending application S.N. 652,417 filed July 11, 1967, entitled "Redox Fuel Cell Electrolyte," describes the functions, advantages and useful composition of a universal electrolyte, which can be oxidized by technically available oxidizers to electrically charge the cathode; or reduced by common fuels to charge the anode; of a redox cell, without the use of solid noble or other metallic catalysts. Although my described system results in operating cell voltages of over 0.3 volt, it is still difficult to obtain single cell voltages higher than 2 volts. For power generation, higher voltages like 100 or 400 volts may be required in cells large enough to yield many amperes of useful electrical current. This higher terminal voltage is obtained by electrically connecting a multitude of cells in series into a battery.

Present fuel cells also have the problem of conducting the oxidizer or the reducing fuel separately to every single cell of a multiple cell battery. This requires complicated and expensive electrode arrangements, gas distributing systems and solid metallic catalysts in the electrodes.

SUMMARY

The anolyte and catholyte of a multiple cell redox battery are each circulated to one of a pair of regenerators where they are respectively reduced and oxidized and recirculated to the cells. This is particularly effective in cells which use a universal eletcrolyte of the same overall chemical composition serving in its reduced form as anolyte and in its oxidized form as catholyte. It is thus feasible, without deleterious energy losses, to regenerate, continuously or intermittently, the spent catholyte of a multiple-cell redox battery with the cells electrically connected in series, in one single regenerator where the electrolyte is oxidized with a suitable oxidizer and pumped back to the cells of the battery. The anolyte of all cells is similarly pumped to a single regenerator which reduces the spent anolyte with a suitable reducer or fuel. The regenerated anolyte is then pumped back to the anode chambers of the cells in the battery.

Even when electrically non-conductive tubing is used, such a system with the cells electrically connected in series, essentially constitutes an electrical short circuit of the battery. Surprisingly, however, this electrical shunt causes negligible inefficiency, and may even have desirable characteristics, provided the individual fluid passages, connecting each individual electrode chamber with the central regenerating system, have a length to average inside diameter ratio of ten to one or more.

One of the advantages of such a system, serving a multitude of cells from two central regenerators, is a substantial saving in engineering complexity and system cost.

Another advantage is the heating of the electrolyte by Joule heat, which offsets the latent heat required to evaporate fuel reaction waste products like water.

Still another advantage is the advantageous possibility of mixing part of the total anolyte with the catholyte for purging with air, and vice versa to balance the amounts of anolyte and catholyte circulating. Such mixing is only permissible if the overall chemical composition of the anolyte is the same as of the catholyte, as is the case with the universal electrolyte described in the aforementioned copending patent application.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which the single figure is a schematic diagram of one embodiment of this invention.

DESCRIPTION OF THE DRAWINGS

As shown in drawing, the multiple cell battery 1 includes a number of cells 30A–Z each having a negative electrode or anode 2 and a positive electrode or cathode 3. Each cell 30 is sealed into its own separate enclosure with the chambers of each cell 30 being joined by a porous membrane, wall or separator 4. Each single cell 30 is electrically separated from its neighbors in the battery, with exception of an electrical connection 5 going from its positive terminal to the negative terminal of its neighbor and vice versa, which electrically series connects the cells in the battery. The power is taken off from the battery at its negative terminal 6 and its positive terminal 7. Within each cell 30, both the electrical current and the necessary accompanying electrochemical mass transport pass through the porous separator 4. This electrochemical mass transport is possible because the cell is filled with conducting liquid or electrolyte. The electrolyte in the anode chambers 32 is called anolyte 34 and in redox cells has to be regenerated, after serving its purpose of charging the anode negatively, by chemical reduction with reducing substances called fuel, for example, methyl alcohol or methanol.

In the system of the invention, this is done in an external regenerator 10, to which the anolyte 34 is transferred from the anode chambers 32 by pump 9. The flow of reducing fuel into this regenerator is symbolized by arrow 11. After reduction, the anolyte 34 is again transferred back to the anode chambers 32 by duct 12. Anolyte 34 of the neighboring cell, and actually from all anode chambers 32 in the battery, is pumped to the same regenerator 10 and transferred back to anode chambers 32 by individual ducts 12 leading from multiple header 13 to all anode chambers 32. Similarly, the effluent of all anode chambers 32 is collected by multiple header 22 through individual feeders 23.

In the same way, the cathode chambers 36 of the cells are filled with catholyte 14 which is transferred by pump 15 to regenerator 16 where the spent catholyte is re-oxidized by some oxidizer, for example air, which symbolically enters regenerator 16 as designated by arrow 17. Since air contains only 20% oxygen useful for oxidation of the catholyte, the spent air leaving regenerator 16 at 18 contains at least 80% of its original volume in nitrogen. At the same time, this spent air sweeps out of the spent catholyte 14 the end products of electrochemical oxidation, for example, water and carbon dioxide. These united products are either formed in the catholyte or diffuse into it from the anolyte through the porous membranes or separators. The regenerated and reoxidized catholyte 14 enters the cathode compartments 36 of the battery through the feeders 19, branching off from header 20.

Catholyte from all cells in the battery is collected in multiple header 21 and after regeneration is redistributed through multiple header 20 and feeders 19. Although this circuit should be made of essentially electrically nonconducting piping or tubing material, the conducting catholyte (and the same applies to the anolyte circuit just discussed) in essence constitutes an electrical short circuit or shunt of the cells in the battery. However, the individual feeders 19 and 23, and also 12 etc. of the anolyte and catholyte circuits, individually leading to and from all electrode chambers, are constructed and arranged in such a way that, for the shortest feeder, its length L is at least ten times its average inner diameter $d$. This makes the electrical shunt currents small as compared to the current producing capacity of each cell and hence of the total battery. "Average" as mentioned here means the square root of the product of the largest times the smallest inner diameter of the feeder or duct in question.

As previously mentioned, the inert components of the air used as oxidizer, in leaving the regenerator, can be used to sweep out combustion end proudcts in the form of vapor. To supply the heat of evaporation, heat is required which in an efficient redox cell will not be produced by the oxidation (or reduction) reaction. It is now the electrical shunt current flowing through the multiple electrolyte distribution system which, at least in part, supplies this necessary heat as Joule heat.

Another source of heat can be obtained by mixing a certain amount of catholyte with anolyte, or vice versa, which may be done by metering devices or valves 24 and 25. This mixing has the added advantage of a direct purge of combustion end products in the anolyte by the spent oxidizer gases sweeping the catholyte regenerator. Such a cross-connecting circuit is only possible with the use of a universal redox electrolyte as described in the aforementioned copending application.

The centralized regeneration and distribution system of the invention is independent of any particular cell construction or shape, or of any particular reducing or oxidizing agents. The system can even be used to advantage if the redox electrolyte is regenerated electrically to heat up the regenerators to optimum working temperature.

The following are useful independently and in conjunction with the primary invention of this present application.

BIPOLAR ELECTRODES

In a battery of redox cells using carbon or graphite plate electrodes, these electrodes can be, on one side, cathode for one cell, and on the other side anode for the next cell. In this way cells are electrically connected in series.

The only requirement is that the electrode has also to be effective as cell container, hence should be joined reasonably leaktight to the rest of the cell container (which should be electrically insulating). The electrode could be made to slide in grooves in the cell wall, hence easily replaceable in case it became oxidized through on the cathode side. Slight leakage of the joints would be permissible in case of a unified electrolyte.

PROFILING OF ELECTRODE SURFACES

To enhance replacement of depleted anolyte over the anode surface, or catholyte over the cathode, convection stirring should be added to the natural diffusion processes by providing the electrode surface with grooves or ripples at an angle to the main direction of electrolyte flow, so as to induce convergence and shear.

In unipolar electrodes, this is most important on the side of the permeable membrane or porous separator. Yet, to minimize undesirable mixing of anolyte and catholyte, the separator itself should have as smooth a surface as is technically possible.

CLEANING ELECTRODES WITH CHARGING PULSES

Impurities from the fuel may coat the electrodes with a layer with high electrical resistance, restricting diffusive contact between electrode and electrolyte. This layer may be removed or blown off by momentarily changing the electrical connections between the cells in a battery in such a way that a larger number of cells (which means higher voltage) send their normal discharging current through a smaller number of cells in reverse direction, which now become overcharged and will start to produce hydrogen and oxygen in small bubbles which blow off any undesirable coating. By cycling the connections, all cells of the battery can have a turn at being cleaned.

AUTOMATIC DRAINAGE AT SHUT-OFF

To avoid depletion of the electrolyte in batteries due to the short-circuit current running through the electrolytic shunting system during shut-off, the headers upstream from the pumps should contain three-way valves which separately connect the headers to an anolyte and a catholyte sump. Simultaneously a venting valve should open at the highest point in the system, allowing air in so the cells can drain their electrolyte to the sumps. This may be combined with the aforementioned programmed cycle of charge-cleaning of the electrodes and of air bubbling through the chambers to help flush any sludge or residue into the sumps.

Since the sumps will cool, excess dissolved salts from fuel residues (ashes!) will crystallize out. Upon restarting fuel battery, the pumps will pump the electrolyte back from the sumps through filters, delivering it clean to the battery for further duty. Filters and sumps may be cleaned out periodically. Since the anolyte and catholyte are still original strength, they will immediately power the cells and supply energy for reheating and running the regenerator-reactors. Since there would not be battery power available for the first pumping back, the sumps may continuously be kept under air pressure, which will drive the electrolyte through the filters into the battery. Or an auxiliary storage battery may drive the pumps.

ISOLATION AND DISCONNECTION UPON IMPACT

If a redox battery is used in a vehicle, it is desirable that, upon collision of the vehicle, neither the stored electrical nor the stored chemical energy should discharge catastrophically.

This can best be effected with an impact switch which, upon impact, opens the electrical circuit (preferably double pole, close to the battery). When this happens, solenoid valves in the lines to and from the regenerators which stay open when energized, will drop closed. Other solenoid valves in the drain lines to the sumps (as described in the above paragraph) which stay closed when energized, will open and dump the electrolyte in the sumps. Even if complete drainage would take too long, any pressure on the liquid due to the battery folding up under impact, will be relieved, and the chance of spilling, reduced.

SEPARATE ANOLYTE REGENERATION SYSTEMS FOR USE WITH SOLID FUELS

Since many solid fuels, from corn-husks to cockroaches, can be used to regenerate or reduce the spent anolyte, use should be made of inexpensive materials. They may however, as opposed to refined liquid fuels, contain a considerable amount of indigestible material or ashes, or soluble inorganic salts which might tend to crystallize out and jeopardize the proper operation of the cells.

To keep these slags out of the battery, a separate electrolyte circuit may be used. One anolyte circuit feeds the battery. Another percolates through the solid fuel and regenerates the anolyte of the first circuit electrically. Electron transfer is through a carbon electrode plate separating both circuits, and the complementary ion transfer is through a porous separator elsewhere between the two liquids. Joule heat losses should be minimized by keeping current paths through the liquids as short as possible, and this may lead to a construction like a normal cell, but with the two electrodes electrically connected to each other and each anolyte passing through a separate electrode chamber. The fuel-regenerated anolyte will thus create a half-cell; the cell-anolyte will be regenerated thereby creating a half-cell potential of equal voltage but polarity opposed to the first half-cell.

The fuel-circuit may then have filters, separators and crystallizers; preferably two fuel-circuits alternate: one regenerates battery-anolyte, while the other is cleaned out. It is also possible to use fuel anolyte of a different chemical composition from battery-anolyte.

SPARGER FOR GASEOUS OXIDIZER

If a gaseous oxidizer is used in a redox cell or battery, like oxygen or air, it is advantageous to saturate the electrolyte with this oxidizer as rapidly and as concentratedly as possible. The best way is to introduce the gas as the finest possible bubbles, using a sparger with the finest pores or a microporous silicone rubber membrane.

However, if air is used as oxidizer, its nitrogen will also become dissolved in the electrolyte and may come out in the cell or other undesirable places. To remove excess dissolved nitrogen, the electrolyte is purged with larger size air bubbles just before it leaves the oxidizer. These larger bubbles will dissolve back, hence scavenge, some of the dissolved nitrogen (in the larger bubble the partial pressure of nitrogen is only 80% and the total pressure in a larger bubble is smaller than in a smaller bubble due to larger radius of curvature of the surface). These scavenging air bubbles also can be used for controlled removal of water vapor.

METERING OF FUEL LIQUID

Enough fuel should be supplied to the anolyte regenerator to fully reduce the spent anolyte. An overdose of fuel does not hamper this reaction but may dilute the anolyte or build up insulating layers on the anode, or have other undesirable side effects.

A metering device, like a metering pump, which adds just enough fuel to the spent anolyte, is desirable. To actuate this device, and to provide a signal commensurate with the fuel demand, a passive (noble metal; carbon) electrode should be placed in the spent anolyte line to the regenerator, and in the line of regenerated anolyte coming out of the regenerator. The bigger the potential difference between these two electrodes, the higher the fuel demand. The fact that this potential can be enhanced by "shunt-current" flowing, is helpful. The shunt-current signal, which can be taken off separately, and kept out of the concentration—EMF by shorting the liquid between the two concentration-electrodes with an open conductor in the liquid, may be used to program fuel-metering in such a way that overfueling upon electrically overloading the battery, is prevented. Instead of the shunt-current, battery-terminal-voltage or battery-current may be used for such programming.

A similar setup with two concentration-polarization electrodes may be used to control oxidation of the catholyte. In both cases it is the change of concentration of the Red- or the Ox-component which causes the signal EMF.

AUTOMATIC CONTROL OF WATER REMOVAL

Combustion of $H_2$ or organic fuels produces $H_2O$ which dilutes the electrolyte, hence has to be removed. Removal is by boiling off or by sweeping out water vapor with spent or excess oxidizer air. The amount of water removal, and maintaining a desired water content in the electrolyte, can be controlled by the temperature of the electrolyte and by the amount of sweeping air. The mechanisms controlling these actions have to be steered, and this now can be done by way of the conductivity of the electrolyte. Assuming a constant battery terminal voltage, the "shunt-current" running through the electrolyte conduits (this application BJ-2) will be a direct function of electrolyte conductivity.

The shunt-current can be used for sensing of the water content in the following ways:

(a) The shunting electrolyte can be made to flow through a helical loop. The electrical current flowing through this electrolyte, will represent one turn on a solenoid, and create a magnetic field which either can deflect a permanent magnet, or an electromagnet taking its eenrgy from the battery terminals. In this case the deflecting action will be correlated to both the shunt current and the battery terminal voltage. If an excess of water dilutes the electrolyte and causes its conductivity to fall, the shunt-current will fall, reducing magnet-deflection. This will cause, by mechanical or electrical means, more air to flow through the regenerator and sweep out more water vapor, or it will increase mixing of catholyte and anolyte in a unified electrolyte system, causing a rise in temperature and making more calories available for the evaporation of water.

(b) The actual shunting current can be taken off from auxiliary electrodes in the electrolyte circuit, taking care that both are located either before or after regenerator to avoid mixing in any concentration-polarization effects. The electrical signal thus obtained can again, directly or after amplification, be used to regulate evaporation processes.

With regard to the influence of battery terminal voltage on water-elimination: as long as an increase in load on the battery, resulting in a drop of terminal voltage, goes parallel with an increase in the use of fuel, the drop in voltage helps water-elimination, and is desirable.

I claim:
1. A multiple redox battery comprising a number of redox cells, each having cathode and anode chambers, electrical conducting means connecting said cells in series, a catholyte regenerator, an anolyte regenerator, said catholyte regenerator being connected to receive, regenerate and return catholyte from all of said cathode chambers by first conduit means, said anolyte regenerator being connected to receive, regenerate and return anolyte from all of said anode chambers by second conduit means, and each of said conduit means having walls of substantially electrically non-conductive material and having a length through the conduit between any two cells of at least ten times the average inside diameter of said conduit means.

2. A battery as set forth in claim 1 wherein cross-connecting conduit means connects said catholyte regenerator with said anolyte regenerator whereby amounts of anolyte and catholyte in said battery can be mixed with each other.

References Cited

UNITED STATES PATENTS

| | | | |
|---|---|---|---|
| 3,143,440 | 8/1964 | Hunger et al. | 136—86 |
| 3,147,149 | 9/1964 | Postal | 136—86 |
| 3,350,226 | 10/1967 | Lieb et al. | 136—86 |
| 3,382,104 | 5/1968 | Worsham et al. | 136—86 |

FOREIGN PATENTS

| | | |
|---|---|---|
| 1,379,800 | 10/1964 | France. |
| 1,409,588 | 7/1965 | France. |
| 1,081,408 | 8/1967 | Great Britain. |
| 722,250 | 11/1965 | Canada. |
| 1,299,346 | 6/1962 | France. |

OTHER REFERENCES

13th Annual Power Sources Conference—April 1959 145,521, "A Redox Type" by Carson et al. pp. 111–113.

ALLEN B. CURTIS, Primary Examiner